Jan. 26, 1937.  A. F. CRAVER  2,069,177

FERRULE

Filed June 8, 1934

ALBERT F. CRAVER
INVENTOR
BY Edmund C. Rogers
ATTORNEY

Patented Jan. 26, 1937

2,069,177

UNITED STATES PATENT OFFICE 2,069,177

FERRULE

Albert F. Craver, Lakewood, Ohio, assignor to The Cleveland Heater Company, Cleveland, Ohio, a corporation of Ohio Application June 8, 1934, Serial No. 729,660

1 Claim. (Cl. 285—122)

This invention relates to pipe joints, and more particularly to joints whereby a tight seal may be made at any point along the axis of the pipe.

In particular it has to do with a special type of ferrule, in which a pipe may be slidably fitted, together with the means for forcing engagement of the ferrule with the pipe at any point along the pipe, to provide a water tight joint. In the drawing.

Figure 1:
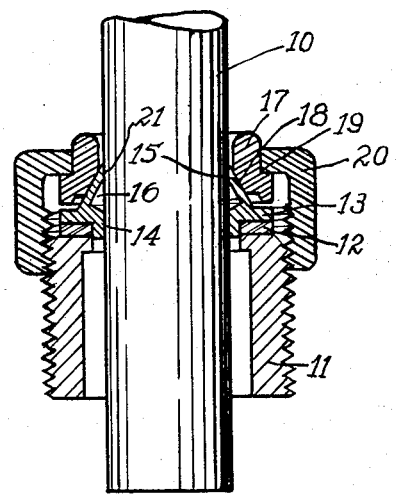
Figure 1 is a section of a pipe joint showing one form of the fitting.

In Figure 1, 10 indicates a pipe adapted to fit into a header or the like 11. It frequently happens that in making connections of this kind the point at which the seal or joint must be made on the pipe cannot be pre-determined, since even in standard plumbing fixtures the location of the fittings may vary. Consequently it is both undesirable and generally impracticable to attempt a threaded or other inflexible connection between the pipe and the member of which it is to be connected. With the types of joints herein shown this difficulty is obviated since the joint will engage at any point along the pipe to provide a tight seal.

The header 11 is externally threaded as shown and is provided with a flat surface on which washer 12 is seated. The washer 12 is engaged between the surface on head 11 and a ferrule 13, the ferrule having an annular skirt portion 14, extending down inside the washer. Ferrule 13 is additionally provided with a frusto-conical projection 15 extending oppositely from skirt 14. Projection 15 is hollow leaving a space 16, whereby the walls of the projection are made thinner and consequently flexible. Annulus 17, having a chamfered surface 18, engages against the outer surface of the conical projection 15. Annulus 17, is also provided with a shoulder 19, engaged by a corresponding shoulder on a union nut 20, which nut is internally threaded so as to engage with the external thread on header 17.

In operation union nut 20, annulus 17, ferrule 13, and washer 12, are slipped over pipe 10. The pipe is then fitted in header 11 to the desired position. The movable members are then slipped down over the pipe and engage as shown in Figure 1 with washer 12 engaging the seat on header 11 and likewise being engaged against the shoulder on ferrule 13. Annulus 17 engages against the conical projection 15 and the union nut 20 is screwed on to header 11. As the nut 20 is tightened down it forces annulus 17, axially of the pipe and binds it against ferrule 13; and in so binding two actions result: First, the conical projection 15 is deformed and forced into an absolute seal with pipe 10. This is made more perfect by reason of the flexibility of the walls of this projection as provided by the hollow portion 16. Second, in forcing the annulus 17 down a compression joint is provided between the ferrule and header 11 by means of washer 12. By this joint, then, fluid is prevented from escaping outside the ferrule by means of washer 12, and additionally prevented from escaping within the ferrule by means of the sealed joint made by projection 15.

As an alternative to the above installation the joint may be set up before the pipe is installed, with the elements exclusive of the pipe 10, being held loosely in the position of Figure 1. The pipe may then be installed through the ferrule to the proper position, after which the joint may be drawn tight.

Figure 2:
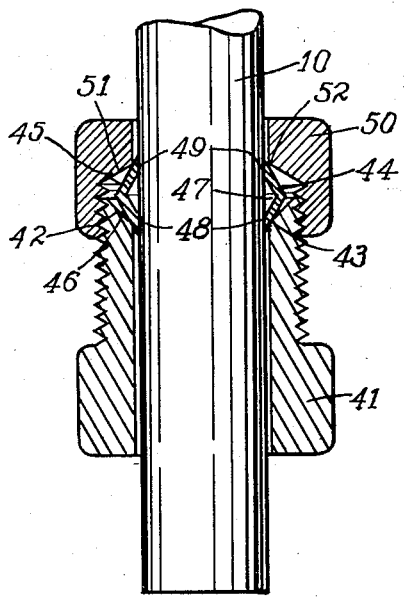
Figure 2 is a section showing another form of such fitting.
Figure 3:
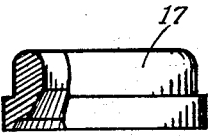
Figure 3 is a detailed view partly in section of the union annulus engaging the ferrule.
Figure 4:
Figure 4 is a detailed view partly in section of the ferrule of the type shown in Figure 1.
Figure 5:
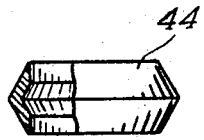
Figure 5 is a detailed view partly in section of the ferrule shown in Figure 2.

In operation the modification of Figure 2 is the same as that of Figure 1. In this modification there is a pipe 10 to be fitted into a header 41. Header 41 is chamfered as at 42 to provide an edge 43 of annular shape. A ferrule 44 chamfered as at 45 and 46 engages against header 41. The chamfer of ferrule 44 is less acute than that of header 41 so that edge 43 provides the contact between ferrule 44 and header 41. The ferrule is hollow as at 47 to provide two ring-like engagements 48 and 49 with the pipe 10; and also to provide that the walls of the ferrule 44 are flexible. Engaging against the ferrule, opposite to header 41, is a union nut 50, chamfered as at 51 in a manner corresponding to header 41 so that it provides an edge 52 engaging the chamfer 45 of ferrule 44. Union nut 50 is internally threaded to engage corresponding external threads on header 41.

In operation union nut 50 and ferrule 44 are slipped over pipe 10, and the pipe engaged into header 41 to the desired position. Union nut 50 is then screwed on to header 41. Tightening on nut 50 forces engagement between edges 43 and 52 with the corresponding chamfers of ferrule 44. Pressure on these two edges, owing to the flexibility of the walls of the ferrule, deforms the walls and forces ring-like edges 48 and 49 into a tight seal with pipe 10. Likewise, a tight joint is formed between the edges 43 and 52 and the ferrule. Thus fluid contained within the header 41 cannot escape outside the ferrule because of the seals at edges 43 and 52; nor can it escape within the ferrule because of the seals 48 and 49.

As an alternative to the installation of this joint, before the pipe 10 is placed into position header 41, ferrule 44 and union nut 50 may be set up loosely in position as shown in Figure 2. The pipe 10 may then be slipped into desired position and the union nut 50 tightened to provide a sealed joint.

It will thus be seen that in each of the two joints shown a fluid tight seal has been provided to prevent the escape of liquids contained within the respective headers, either inside or outside of the ferrules.

Having described the invention what is claimed is:

The combination in a pipe joint of a sealing ferrule of unitary construction comprising an annular body portion adapted for sliding fit upon the exterior of a pipe, an outwardly extending lateral flange adjacent one end of said ferrule providing an annular pocket for the reception of packing material at such end of said ferrule, and a relatively thin walled conical extension on the other end of said ferrule having its smaller diameter adapted to slidably fit the exterior of the pipe, said conical extension being deformable upon external pressure to closely fit said pipe exterior.

ALBERT F. CRAVER.